Patented Jan. 16, 1945

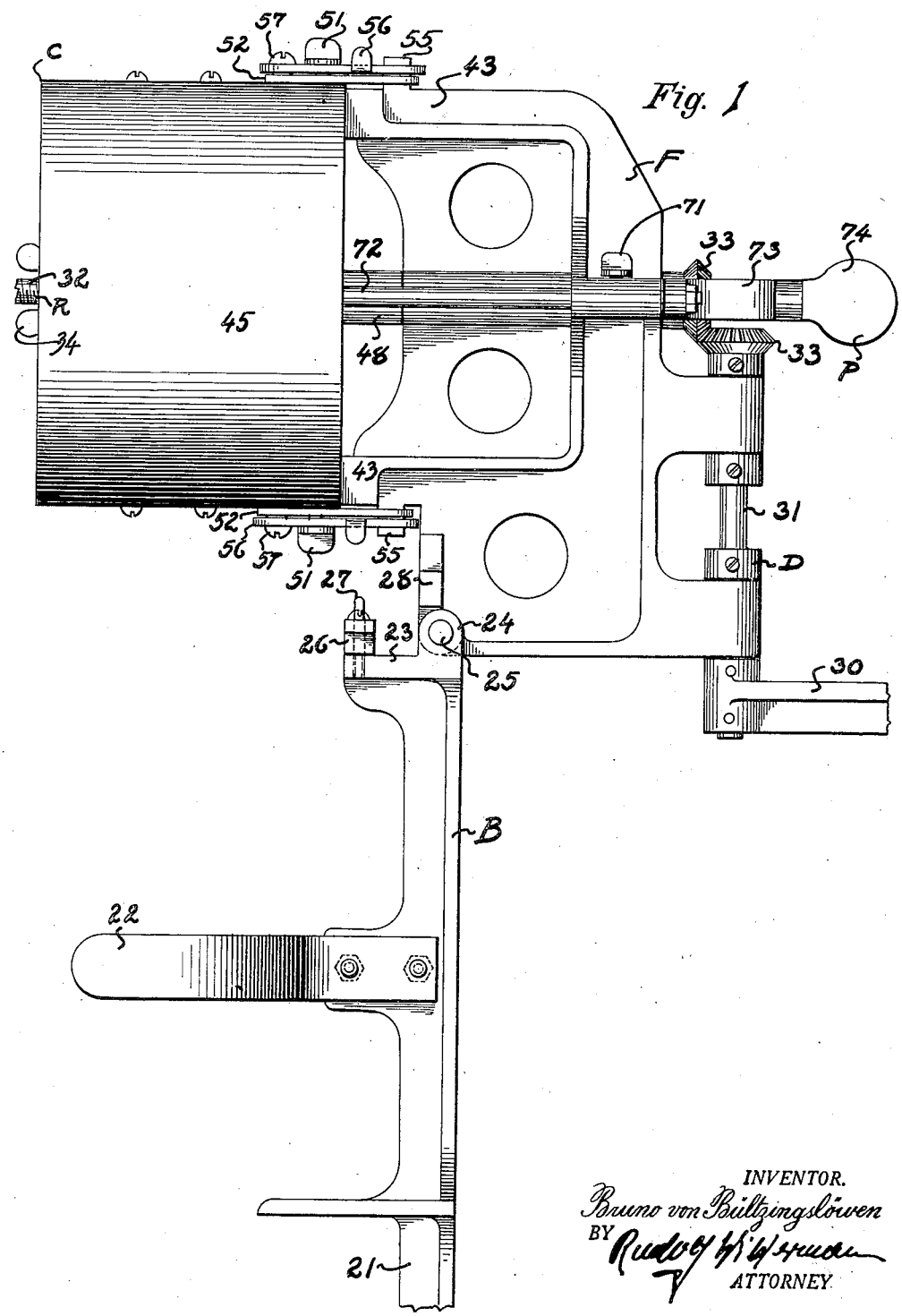

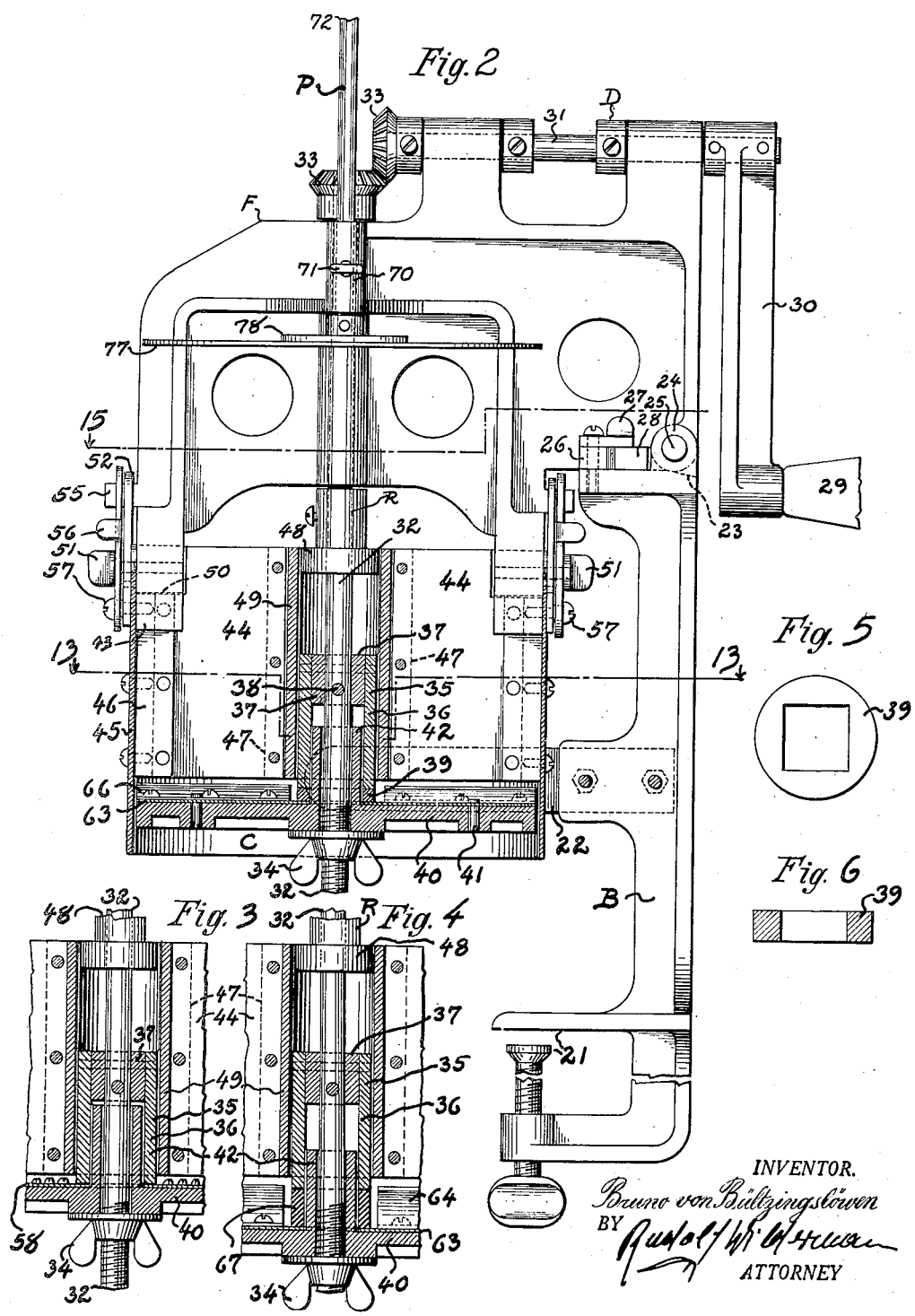

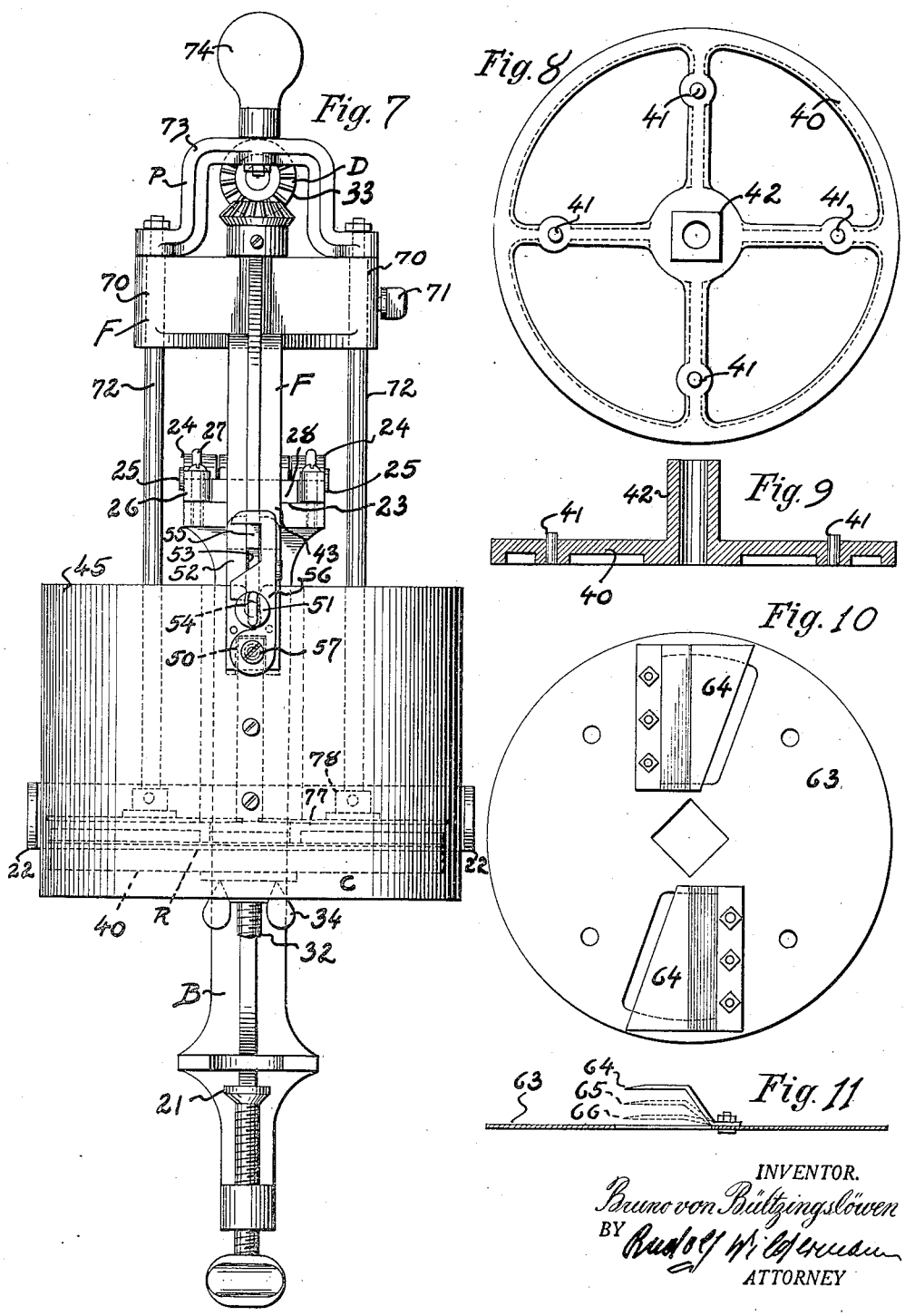

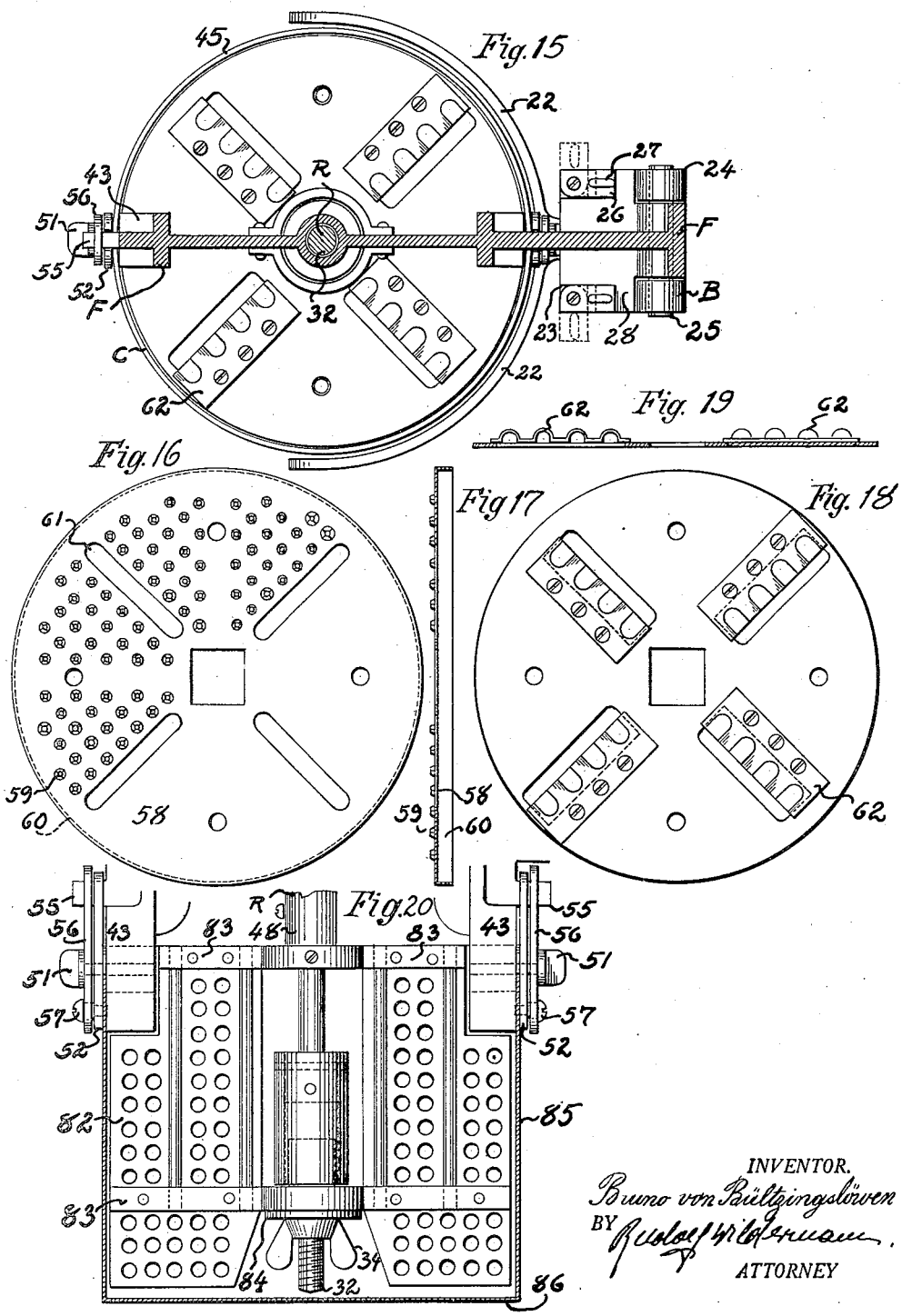

2,367,653

UNITED STATES PATENT OFFICE 2,367,653

VEGETABLE CUTTER

Bruno von Bültzingslöwen, Bronx, N. Y., assignor, by mesne assignments, to C. P. Goepel, New York, N. Y.

Application May 13, 1943, Serial No. 486,871

2 Claims. (Cl. 146—125)

This invention concerns a cutter for vegetables, fruit, dried foods and the like.

One of the objects of this invention provides a cutting implement or utensil which simplifies the cutting operation, permitting the user to effect the operation by simple manipulation, e. g. pressing and cranking, and without running the danger of cutting him- or herself.

The invention has the further objective of permitting the handling of comparatively large quantities of food in a simple cutting or mixing device, by which the desired operation is carried out expeditiously and with comparatively little physical effort.

The invention has also the feature of providing a simple, rugged mechanism which can be easily cleaned and permits a ready change from one cutting tool to another or an exchange between cutting and mixing tools.

The invention has the additional object of providing a device which yields, substantially automatically, a great uniformity of the product of the operation, be the material partly cut, e. g. by slicing, dicing, slivering, paring, chopping or peeling, or be it substantially complete comminuted, such as in mashing, grinding, scraping or grating operation. Likewise mixing tools may be readily applied to a device of this invention in a manner, be that a beating, churning, whirling, kneading, stirring, whipping, agitating or the like.

Furthermore the invention provides for a simple charging and a uniform feed under substantially equalized pressure of the provisions handled, the application of pressure being guided in coordination with gravitational effects.

These and other objects of the instant invention, as they also will be discussed hereinafter, are exemplified in the embodiment of the accompanying drawings and in the following description thereof. Such exemplification of the invention is to be interpreted in illustration only, but not in limitation of the invention.

In the drawings:

Fig. 1 is a side view of an embodiment of this invention, some of the portions jutting out being cut away.

Fig. 2 is a corresponding side view of said embodiment, the operative part being partly cross-sectioned. This view shows the device in a position ready for operation, whereas the view of Fig. 1 shows it in an intermediate position into which it is swung for the purposes of cleaning, resetting, the replacement of parts, etc.

Fig. 3 is a corresponding detail cross-section of the lower end of the operative arbor showing a set-up for grating.

Fig. 4 shows a corresponding arrangement but in a set-up for slicing.

Figs. 5 and 6 are a top view and a cross-sectioned front view respectively, of a spacer used for arranging various cutting tools on the device of the invention.

Fig. 7 is a front view corresponding in part to the side views of Figs. 1 and 2; i. e. it corresponds to the view of Fig. 2 inasmuch as the frame is in an operative position, but it corresponds to Fig. 1 inasmuch as the plunger on the frame is in a lowered position.

Figs. 8 and 9 are a top and a cross-sectioned front view, respectively, of a web serving as a holder or support for the cutting tool.

Figs. 10 and 11 are a top view and a cross-sectioned front view, respectively, of a slicing tool to be mounted, e. g. by way of a web 8 and 9, on the device of Figs. 1, 2 and 7.

Figure 12:
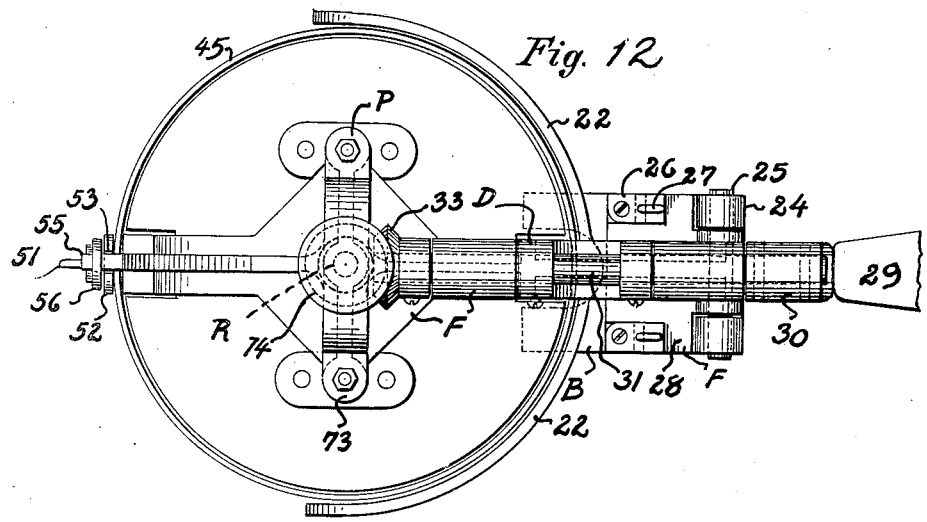

Fig. 12 is a top view of the device, corresponding to the views of Figs. 2 and 7.

Figure 13:
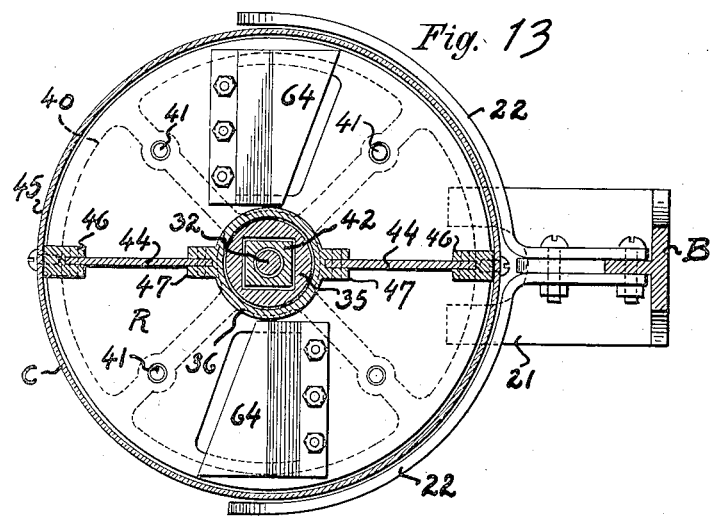

Fig. 13 is a corresponding horizontal section, the level of which is more particularly pointed out in the view of Fig. 2 by a dot-dash line and the numeral 13.

Figure 14:
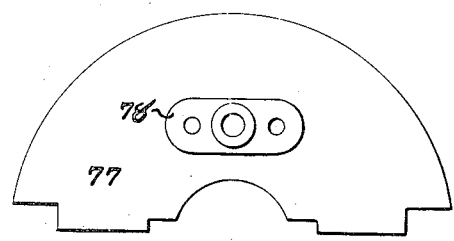

Fig. 14 is the top view of a plate sector forming part of the plunger P.

Fig. 15 is another horizontal cross-section viewed from the top of Fig. 2 at the level there pointed out by a dot-dash line and the numeral 15.

Figs. 16 and 17 are a top view and a cross-sectioned side view, respectively, of a grating or grinding tool.

Figs. 18 and 19 are corresponding tools of a paring or slivering tool.

Fig. 20 is a detailed side view of the operative part of the device of the invention, in which the cutting parts are replaced by mixing parts.

Similar numerals refer to similar parts throughout the various views.

As general parts the embodiment shown comprises a base B, a frame F mounted on said base and accommodating a rotor R with a drive D, as well as a plunger P. Retaining means for the material worked upon are generally denoted as container C and are in the instant embodiment shown attached to the frame F.

The base B may assume any suitable form known to those acquainted in this art. In the embodiment of the drawings the base B has a C-clamp 21 for attaching it to a table or the like. Arms 22 are mounted upon opposite sides thereof for guiding a container C into and for retaining it in place.

In the embodiment of the drawings the frame F is fulcrumed upon base B. For such purpose the base B has a substantially flat top 23 from which extend up, on opposite sides, the lugs 24. By way of a pin 25 the frame F is hinged upon said lugs 25 and can be swung upon the base B from the position shown in Fig. 2 into that shown in Fig. 1, the distribution of weight of the frame being such, that the frame stationarily rests in both of these positions, the center of gravity being shifted to the left of the fulcrum point in the position of Fig. 2, and to the right of the fulcrum point in the position of Fig. 1. Upon opposite sides latches 26 with handles 27 are swivelable on the top 23 of the base, such latches being swingable from the disengaged position shown in dotted lines of Fig. 15 into the engaged position there shown in solid lines. When thus swung, said latches 26 jam or lock upon flaps 28 extending on opposite sides from the frame F when those flaps rest upon the top 23 of base B in the position of Fig. 2.

Drive D on top of frame F may be actuated by hand or motor. The drawings show it arranged for manual operation, handle 29 on crank 30 serving for operating the horizontal shaft 31.

The rotor R comprises a principal, vertical shaft 32 which is gear-connected to shaft 31, e. g. by miter gears 33. Seen from the front the vertical shaft 32 centrally depends from frame F and has provisions at its lower end for attaching tools thereon for cutting and the like.

In the drawings the lower end of shaft 32 is shown to be threaded for such purpose, such thread accommodating, for instance, a wing nut 34 by which such tool may be clamped from the bottom onto and against collar formation 35.

Collar formation 35 comprises a sleeve 36 spacedly surrounding the shaft 32, the sleeve 36 containing a plug 37 in its upper end. Plug and sleeve are attached, e. g. by pin 38, upon the shaft 32. In the bottomwise open recess of the collar formation 35 a tool or tool holder may be engaged in the sleeve 36. The inner surface of sleeve 36 is non-circular for such purpose, the drawings showing the opening to be square. Collars 39, varying in thickness to suit, may be provided for as downward extensions for sleeve 36, such collars corresponding in cross-section to the non-circular interior of said sleeve (Figs. 5 and 6).

The arbor formation which is thus fixedly provided on shaft 32 may either receive a tool itself, or a web 40, as illustrated in Figs. 8 and 9, which serves as a tool holder, having pins 41 for allocating a tool thereon, and having a hub 42, which may be slid on shaft 32 into the collar formation 35, being outwardly of non-circular cross-section corresponding to the recess in sleeve 36.

The webbing of frame F provides for forked ends 43 which are equally spaced, to the front and the back respectively, of the shaft 32, so that a suitable, e. g. circular container C may be mounted on said forked ends and will surround the cutter or other tool mounted upon the arbor formation at the lower end of shaft 32.

For the uses illustrated by Figs. 1–19 the said container C may be a cylinder 45 with one or more vertical, radical partitions extending partways or wholly thereacross. For such purpose vertical, U-shaped bars 46 are mounted in the front and in the back upon the inside of cylinder 45 and engage upon panels 44. Upon their other side these panels are engaged upon a similar, U-shaped formation 47 projecting on opposite sides from a central sleeve 49, which has a bore clearing sleeve 36 of collar formation 35. At its upper end sleeve 49 surrounds flange 48, which has the same outside diameter as the sleeve 36 of collar formation 35 and which is mounted upon shaft 32 below the frame F.

Slot 50 extends partways up in forked ends 43 in order to accommodate the U-shaped bars 46.

Those U-shaped bars and the panels 44 are, however, cut away above the slots 50 in order to clear the unslotted portions of said forked ends 43. Thumb screws 51 extend into such unslotted portions of the forked ends 43. Flat strips 52 are mounted in the front and in the back upon the cylinder 45 and extend thereabove. These strips 52 as well as the cylinder 45 itself are slotted from the top down, at 53 and 54, respectively, in order to clear the thumb screws 51.

The slots 53 in flat strips 52 also clear at their upper ends the lugs 55 projecting out from the webbing of the frame F. There may be latches 56, which are shown to be fulcrumed upon screws extending from the outside through strips 52 and the wall of cylinder 45 into bars 46. These latches are shown to be cut out to clear the shanks of thumb screws 51 and they hook at their upper ends over the lugs 55 projecting out from frame F.

When thumb screws 51 are tightened up in the assembly in Figs. 1, 2, 7, 12 and 15, they will clamp the cylinder 45 onto the forked ends 43 of the frame F and will also clamp latches 56, so that they are secured in their position of hooking over lug 55. When screws 51 are loosened up, latches 56 may be unhooked, and then the cylinder 45 may be slid off the frame F, provided there is no tool mounted upon the lower end of shaft 32 which would interfere with such slipping off of the cylinder 45.

The lower ends of U-shaped bars 46, or panels 44 and of sleeve 49 with formation 47 extend level with each other, but short of the bottom end of cylinder 45. They furthermore extend short of the lower end of the sleeve 36 of the collar formation 35 to the extent of clearing the projecting cutting portion of the tool to be strapped by a web 40 against the bottom side of collar formation 35.

Such cutting tool may for instance be a grater or grinder plate 58 shown in Fig. 16, such plate being shown assembled on the arbor formation of shaft 32 in the views of Fig. 3. The customarily struck up cutting edges 59 of such a grater 58, only one half of such edges being shown in Fig. 16—clear the bottom level of parts 44, 46, 47 and 49, when such tool 58 is mounted upon web 40. Rim 60 engages at the same time over the periphery of said web, and its round and square clearance holes fit onto pins 41 and hub 42, respectively. Such tool 58 may also be provided with additional recesses to accommodate the ground material on top of the tool, or there may be slots 61 for such purpose as shown in the drawings.

Other tools, like the paring or slivering tool of Figs. 18 and 19 may have cutting edges of knife 62 projecting higher, in which case a suitable collar 39 is inserted between the tool holder and tool on one hand and sleeve 36 on the other hand. A slicing tool may have adjustable blades, or there may be slicing tools 63, like the one indicated in Figs. 10 and 11, which differ from each other as to the height at which these knives 64, 65 or 66 project thereabove. For each height of projection of knives a collar 39 of different thickness may be provided for. Fig. 4 shows, for instance, a comparatively high collar 57 to be used when a slicer plate 63 with knife 64 is mounted upon tool holder web 40.

Hubs 70 with parallel, vertical bores load out on opposite sides from frame F. One or both of these hubs may be provided with set screw 71, which allows a rod 72 slidably accommodated in said hub to be set at any preferred height. The two rods 72 are interconnected at their upper ends by a yoke 73, upon which is superimposed the handle 74. By way of handle 74 the rods 72 may therefore be raised and lowered together. Upon the lower end of rod 72, and substantially in level with each other, the plate sectors 77 are mounted, e. g. by way of flanges 78. These plate sectors are substantially semi-circular and are cut out to clear the forked ends 43 of frame F as well as to fit substantially the two vertical compartments into which the cylinder 45 is subdivided by the panels 44 and the holding means for such panels.

For use the plunger P, the details of which have just been described, may be set in an elevated position upon the device, e. g. by the set screws 71 as shown in Fig. 2. The device is stationarily mounted upon the edge of a table by the C-clamp 21 and a suitable receptacle, e. g. a bowl, is arranged upon the table underneath the cylinder 45. The two compartments, into which the cylinder 45 is subdivided by the panel 44, may now be filled with the vegetable to be sliced, e. g. carrots may be stood on end therein, and the set screw 71 is released so that the plate sectors descend onto the contents of cylinder 45 and may be depressed thereunto by manipulation of handle 74. The user may now start the cutting operation by depressing the plunger P, for instance, with his left hand and by cranking the drive D by the right hand, which is engaged upon handle 29. The slices of carrots cut up by the knife 66 will drop into the bowl below, and all carrots will be cut up and the cranking operation may cease, when the plunger P has been depressed into its lowermost position of Fig. 7, the plate sectors coming to a stop when yoke 73 comes to rest upon frame F. The cutting operation of carrots or of another vegetable may then be continued by repeating the operation just described.

After the operation is finished or if a different tool is to be used, latches 26 may be swung out to release the frame F and the frame may then be swung through substantially 90° to the position shown in Fig. 1. In that position the operative elements may be taken apart, or one cutting tool may be replaced by another, care being taken that one or more collars 39 of suitable height being used, so that the top cutting edge of the tool clears the bottom of the panel 44, the material to be cut being prevented by such panel from rotating together with the cutting tool, until actually cut.

If a mixing operation is to be performed instead of the cutting operation, the cutting tool is first removed, and cylinder 45 is removed in the manner described above. Then a suitable beating, churning, kneading, whirling, stirring, or whipping tool is mounted upon the arbor formation of shaft 32, and upon the forked ends 43 a container C is mounted which has a bottom. This is illustrated in Fig. 20.

The mixing element 81, which is first placed onto the device of this invention, shows suitably reinforced perforated plates 82. The plates which extend in opposite directions from shaft 32 are interconnected by straps 83 riveted onto opposite sides of pairs of said plates 82, one at the top of the plates and the other one near the bottom of the plates. The pair of upper straps 83 rotatably closes around flange 48. The pair of lower straps 83 fixedly engage around a mandrel 84, which corresponds to the tool holder of Figs. 8 and 9, i. e. it has a bore to fit over shaft 32 and has a hub to fit the irregular inside of sleeve 36 of collar formation 35.

In connection with the mixing operation the cylinder 45 of the embodiment of the other drawing is replaced by a round vessel 85, which has a bottom 86, but is free of all obstructions upon the inside. Upon the outside the vessel carries strips 52 and latches 56, so that it may be mounted upon the forked ends 43 of frame F in exactly the same manner in which the cylinder 45 of the other embodiment was mounted thereon.

After the device has thus been arranged for a mixing operation, it is swung from a position corresponding to that of Fig. 1 to one corresponding to that of Fig. 2, the vessel 85 is filled with the material to be mixed, the plate sector 75 may be lowered to prevent splashing and the mixing is effected by cranking drive D.

Having thus described my invention in detail, yet I do not wish to be limited thereby, except as the state of the art and the appended claims may require, for it is obvious that various modifications and changes may be made in the form of embodiment of my invention, without departing from the spirit and scope thereof.

What I claim is:

1. In a cutter, the combination with a vertical standard, a frame pivoted to the upper end of said standard, said frame consisting of a yoke having pairs of radial arms, a container having a vertical axis detachably supported by a pair of said arms, a vertical shaft centrally of said yoke, a tool plate within the container at the lower end of the container and detachably secured to said shaft, pressure means supported above the tool plate by another pair of said arms and movably disposed within the container for pressing the material to be operated against the tool plate, and means on said frame for rotating the shaft and the tool plate thereon, of a support on said standard for detachably holding the frame thereon in horizontal position, whereby the frame with its yoke, container, shaft and tool plate may be moved from its normally operative vertical position to a position at 90° thereto for changing the tool plate, or removing the container.

2. In a cutter, the combination with a vertical standard, a frame pivoted to the upper end of said standard, said frame consisting of a yoke having pairs of radial arms, a container having a vertical axis detachably supported by a pair of said arms, a diametrical partition in said container aligned with the pairs of arms supporting the container, a vertical shaft centrally of said yoke, a tool plate within the container at the lower end of the container and detachably secured to said shaft, pressure plates supported above the tool plate by another pair of said arms and movably disposed within the container at each side of the partition, for pressing the material to be operated against the tool plate, means on said yoke for simultaneously moving the plates towards the tool plate and away from the same, and means on said frame for rotating the shaft and the tool plate thereon, of a support on said standard for detchably holding the frame thereon in horizontal position, whereby the frame with its yoke, container, shaft and tool plate may be moved from its normally operative vertical position to a position at 90° thereto for changing the tool plate, or removing the container.

BRUNO von BÜLTZINGSLÖWEN.